United States Patent [19]

Roberts

[11] Patent Number: 4,601,235
[45] Date of Patent: Jul. 22, 1986

[54] RECIPROCATING PUMP PISTON
[75] Inventor: Emmett T. Roberts, Houston, Tex.
[73] Assignee: TRW Inc., Cleveland, Ohio
[21] Appl. No.: 621,832
[22] Filed: Jun. 18, 1984
[51] Int. Cl.⁴ .............................................. F16J 9/00
[52] U.S. Cl. ................. 92/245; 277/188 A; 277/212 C
[58] Field of Search ............... 92/240, 244, 245; 277/212 C, 205 R, 188 A, 152

[56] References Cited

U.S. PATENT DOCUMENTS

| | | |
|---|---|---|
| 1,618,412 | 2/1927 | Dorward . |
| 2,295,160 | 9/1942 | Christenson .......... 92/244 |
| 2,366,832 | 1/1945 | Christenson .......... 309/34 |
| 2,677,581 | 5/1954 | Taylor, Sr. ........... 92/244 |
| 2,840,426 | 6/1958 | Salansky .............. 309/4 |
| 2,840,428 | 6/1958 | Browall .............. 309/23 |
| 2,884,291 | 4/1959 | Whitten ............ 92/240 X |
| 2,963,330 | 12/1960 | Arnes ............... 277/205 X |
| 3,008,781 | 11/1961 | Milster ............... 309/23 |
| 3,131,611 | 5/1964 | McLaughlin ........ 92/244 |
| 4,203,353 | 5/1980 | Burnham et al. ..... 92/159 |
| 4,281,590 | 8/1981 | Weaver .............. 92/244 |

FOREIGN PATENT DOCUMENTS

| | | | |
|---|---|---|---|
| 195787 | 2/1958 | Austria ............... | 92/240 |
| 1155580 | 12/1957 | France ............... | 92/244 |
| 1142265 | 2/1969 | United Kingdom ... | 277/188 A |

Primary Examiner—Edward K. Look

[57] ABSTRACT

A reciprocating pump piston includes a piston rod which is adapted to be disposed within a cylinder. A piston hub is secured to the piston rod and is adapted to be reciprocated thereby within the cylinder. The hub includes a flange portion having a cylindrical outer periphery of slightly smaller diameter than the inner diameter of the cylinder and a generally cylindrical body portion having a diameter smaller than the flange portion. An annular piston seal ring is disposed about the hub body portion. The seal ring includes an inner leg disposed in mating relation with the body portion and an outer leg defining an annular sealing lip which yields radially inward upon insertion of the hub into an associated pump cylinder. Yielding of the outer leg is to a predetermined extent sufficient to block dislodgement of the inner leg from mounted association with the hub body portion. Also provided is an annular anti-extrusion member disposed around the hub body portion intermediate the seal ring and the hub flange portion. The hub body portion includes a circumferential groove adjacent the forward end thereof, and the seal ring inner leg includes portions which closely fit into the groove.

12 Claims, 3 Drawing Figures

RECIPROCATING PUMP PISTON

BACKGROUND OF THE INVENTION

This invention generally relates to improvements in reciprocating pumps. More specifically, the present invention relates to an improved piston for such pumps. Although the invention will be described with particular reference to a pump piston used with slush or mud pumps, it will be recognized that certain features thereof may be used or adopted to use in other types of reciprocating pumps.

Slush or mud pumps are used in connection with oil well drilling operations for pumping drilling mud. Such pumps typically operate at high pressures due to the necessity for pumping the drilling mud through perhaps several thousand feet of drill stem. Moreover, it is necessary for the mud to emerge from the drill bit at a relatively high velocity in order to provide lubrication and cooling to the bit, and in order to provide a vehicle for the removal of drill cuttings from the earth formation being drilled.

The pistons and cylinders used for such mud pumps are susceptible to a high degree of wear during use because the drilling mud is of high specific gravity, and has a high proportion of suspended and gritty abrasive solids which can be quite erosive. As the pump cylinder becomes worn due to erosion, the small annular space between the piston and the cylinder wall will increase substantially. Because of this result, the seal design for such pumps is critical.

The high pressure abrasive environment in which the pumps must operate is especially deleterious to the seals since considerable friction is generated, and since the hydraulic pressures encountered force the seal into the annular space between the cylinder wall and the piston. Indeed, the frictional forces may even detach the seal from the piston. With piston movement, the edges of a conventional seal become damaged very quickly by the cutting or tearing action that occurs to the seal material. Another problem with conventional mud pump seals is that they do not adequately "wipe" the cylinder wall so that the pressurized drilling mud thus seeps between the seal and the cylinder wall.

Attempts have been made to securely fasten the seal in the piston to resist this frictional force. One conventional solution to this problem has been use of a metallic seal retainer which is disposed over the seal body and retained in place by snap rings. However, one disadvantage to this solution is that the additional seal retaining element and its snap rings render the overall piston construction more expensive. A further disadvantage is that the seal is made somewhat less flexible and resilient than it would otherwise be, thus decreasing its ability to wipe the cylinder wall effectively.

Another previously proposed solution to the problem has been the use of a sealing element which has an interlocking relationship with the piston hub structure. One disadvantage of this system has been the precise nature of the interlocking construction employed. That is, the interlocking construction is generally triangular in shape and does not provide sufficient surface area to afford a sturdy interlock connection. Moreover, the piston seal does not have a separate, resilient cylinder wall contacting leg or lip.

Although resilient wall contacting lips or legs are known for piston seals used in air or hydraulic brake systems and in stationary joints in water pumps, they are not adapted for use in the high pressure abrasive environment of slush or mud pumps. One reason for this is due to the fact that the design parameters are such that the seal rings would not be prevented from being dislodged from the piston under the high friction conditions encountered in slush or mud pumps. Another reason is due to the fact that in brake systems, for example, the gap between the wall contacting leg and inner leg is not designed to prevent collection of large amounts of particulates since such particulates are not present in these systems. Thus, if such seals were used on slush pumps, the effectiveness of the seal would quickly be diminished.

It has, therefore, been considered desirable to develop a new and improved reciprocating pump piston which would overcome the foregoing difficulties and others while providing better and more advantageous overall results.

BRIEF SUMMARY OF THE INVENTION

In accordance with the present invention, a new and improved reciprocating pump piston is provided which is comprised of a piston hub fitted with a seal ring. The seal ring is configured so as to permit easy installation onto the hub and to effectively prevent dislodgement of the seal ring therefrom when the piston is operatively disposed within an associated cylinder.

More particularly in accordance with the invention, the reciprocating pump piston has a piston rod adapted to be disposed within a cylinder. A piston hub, in turn, is attached to the piston rod for reciprocation thereby. The hub includes a flange portion having a cylindrical outer periphery of a slightly smaller diameter than the inner diameter of the cylinder, and a generally cylindrical body portion having a diameter less than that of the flange portion. An annular piston seal ring is positioned about the hub body portion. The seal ring has an inner leg disposed in mating relation to the body portion, and an outer leg which defines an annular sealing lip. The inner leg may be flexed radially outward to facilitate mounting of the seal ring on the hub. The hub body portion includes a circumferential groove adjacent the forward end thereof spaced remote from the flange, and the seal ring inner leg includes portions which closely fit into the groove. The outer leg yields radially inward upon insertion of the piston into an associated pump cylinder, and such flexure prevents dislodgement of the seal ring inner leg from mounted association with the hub body portion groove.

In accordance with another aspect of the invention, an axially extending aperture is provided between the seal ring inner and outer legs to accommodate selective flexure thereof. Preferably, the sidewalls of the aperture are disposed relative to each other at an included angle of approximately 30°.

According to a further aspect of the invention, an anti-extrusion member is disposed about the hub body portion intermediate the seal ring and hub flange portion. Preferably in accordance with the invention, the anti-extrusion member is constructed of nylon and the seal ring is constructed of a rubber-like material. It is also possible to form the anti-extrusion member integral with the seal ring.

In accordance with a still further aspect of the invention, seal means are interposed between the piston hub and the piston rod.

The principal focus of the present invention is the provision of an improved reciprocating pump piston.

One advantage of the invention is the provision of such a piston construction wherein an annular piston seal ring has an inner leg disposed in a mating receiving groove provided in the piston hub.

Still another advantage of the invention is the provision of a piston seal ring which can be snapped into the receiving groove and is prevented from being dislodged when the piston is positioned in an associated cylinder.

Another advantage of the invention is the provision of a piston seal ring which has a resilient outer leg defining an annular sealing lip.

Yet another advantage of the invention is the provision of an annular anti-extrusion member in association with the seal ring.

Still other advantages and benefits of the invention will become apparent to those skilled in the art upon a reading and understanding of the following detailed description.

BRIEF DESCRIPTION OF THE DRAWINGS

The invention may take physical form in certain parts and arrangement of parts, a preferred embodiment of which will be described in detail in this specification and illustrated in the accompanying drawings which form a part hereof and wherein.

DETAILED DESCRIPTION OF THE PREFERRED EMBODIMENT

Figure 1:
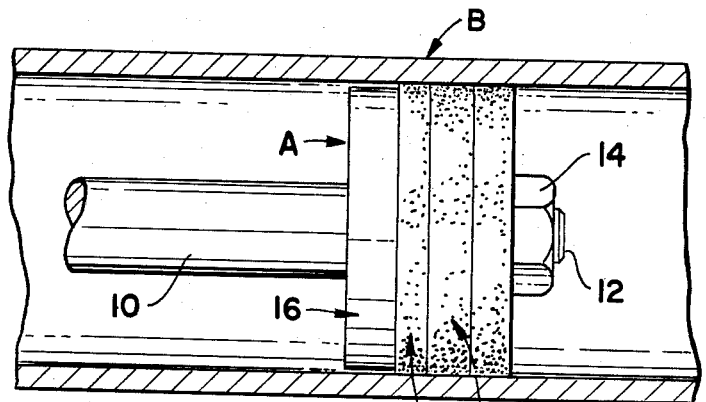
FIG. 1 is a side elevational view in partial cross-section of a slush or mud pump which includes a pump piston formed in accordance with the present invention.

With reference to the drawings, wherein the showings are for purposes of illustrating the preferred embodiment of the invention only, and not for purposes of limiting same, FIG. 1 shows a piston A disposed within an elongated pump cylinder B. Piston A is particularly suited for use as a pump piston in pumping drilling mud used in an oil well drilling operation. However, it is also possible to employ the piston for other pumping purposes. Although the piston construction shown in FIG. 1 is of the type which would be utilized in simplex type pumping systems, it is evident that the piston construction could also be of a duplex type.

Piston A may be seated on a piston rod 10 having a threaded free end 12 and to which a suitable nut 14 is secured. Included in the piston construction is a piston hub 16 which is secured against movement in a first direction relative to the rod 10 by nut 14. To secure hub 16 against movement in the oppostie direction, rod 10 may include a radially outward extending shoulder (not shown), or may be provided with a gradually increasing diameter. Positioned on the piston hub 16 are an anti-extrusion member 18 and a seal ring 20.

Figure 2:
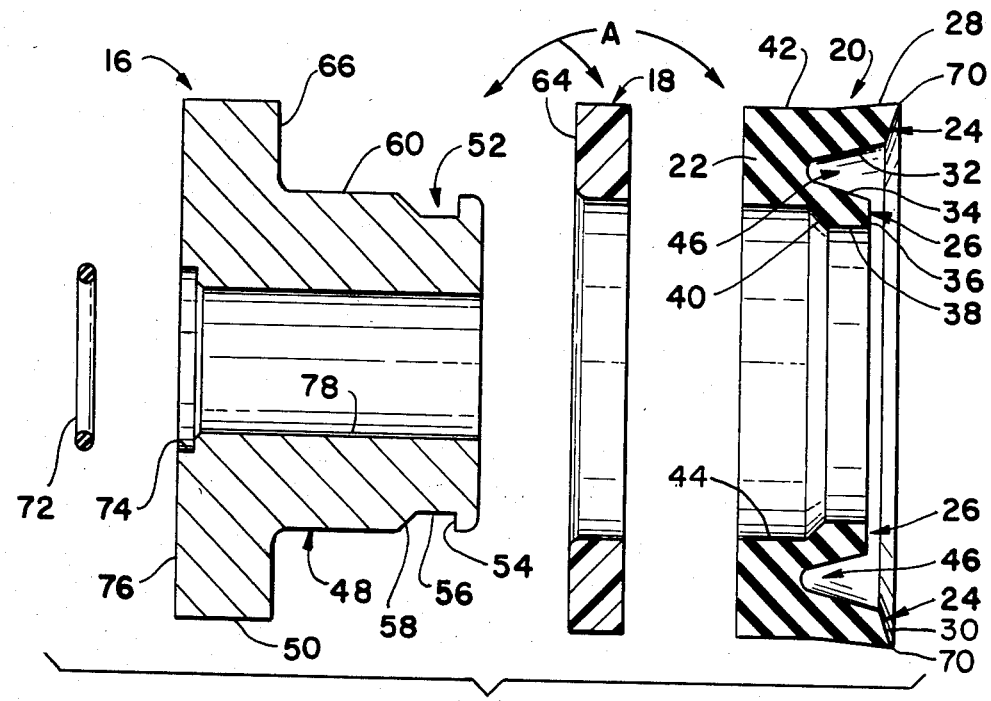
FIG. 2 is an exploded axial cross-sectional view of the piston of FIG. 1.

Referring to FIG. 2, seal ring 20 is Y-shaped and includes a stem or body portion 22, a lip or outer leg 24, and an inner leg 26 extending generally axially from one end of the stem. Outer leg 24 includes an outer side wall 28, an end wall area 30, and an inner side wall 32. Inner leg 26 includes an outer side wall 34, an end wall area 36, and an inner side wall comprised of axial and tapered portions 38, 40, respectively.

Outer leg outer side wall 28 merges into an outer side wall 42 of body 22, and tapered portion 40 of inner leg 26 merges into an inner side wall 44 of the body. An annular aperture or gap 46 is formed between outer and inner legs 24, 26 from the end wall areas thereof, and this groove extends axially into body 22 itself.

Figure 3:
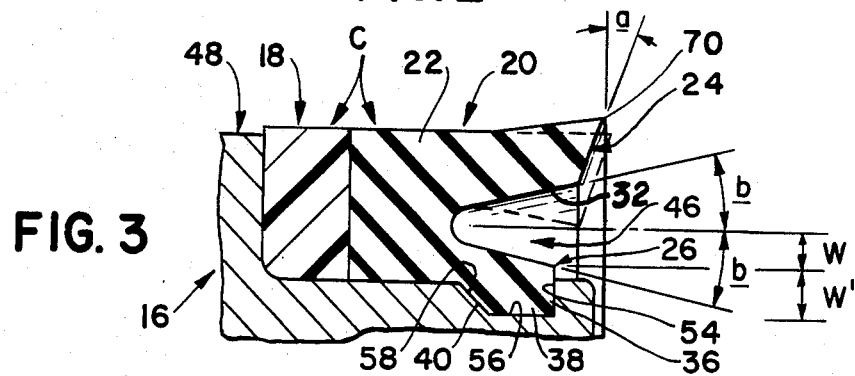
FIG. 3 is an enlarged view of a portion of the piston shown in FIG. 2 in the assembled condition.

Anti-extrusion member 18, although shown in exploded view in FIG. 2, is preferably integral with seal ring 20 in order to insure proper functioning of the piston by preventing seal ring extrusion. Accordingly, anti-extrusion member 18 and the seal ring 20 are permanently bonded together at an interface area therebetween to form a seal assembly C (FIG. 3).

Anti-extrusion member 18 may be constructed of rubber reinforced with multiple plies of a fabric material such as nylon. Preferably, the anti-extrusion member 18 and seal member 20 are molded together and cured as a single piece. Preferably, seal member 20 is constructed from a synthetic rubber which is made by the polymerization of acrylonitrile or vinylcyanide with butadiene. This material, commonly known as "buna" rubber, has good impermeability to gases and most liquids, as well as having good resistance to plastic flow and abrasion or tearing. However, it would also be possible to use other suitable materials for the construction of both anti-extrusion element 18 and seal ring 20.

To assemble the piston, seal assembly C is slipped over a body portion 48 of piston hub 16 until it abuts a radial hub flange 50 which has an outer diameter slightly less than the inside diameter of a cylinder with which it is to be associated. The seal assembly is retained in this abutting position by the cooperation of seal ring inner leg 26 with a suitable circumferential groove 52 disposed in hub body portion 48 adjacent the hub body forward end. Groove 52 is defined by a forward side wall 54, a bottom wall 56, and a tapered rear side wall 58. Wall 58, in turn, merges into the hub body outer side wall 60.

Anti-extrusion member 18 is dimensioned to closely fit over hub body portion 48 without flexure as the seal assembly C is inserted axially onto the hub. When, however, seal ring 20 is inserted onto the hub body portion, inner leg 26 is flexed outwardly to enable inner side wall 38 of the inner leg to clear the forward end of the hub body portion. Such flexure is made possible since inner leg 26 is capable of bending or flexing outwardly into aperture 46 between legs 24, 26. When the inner leg has cleared the forward end of the hub body portion, it will move radially inward toward its rest position with inner side wall 38 of the inner leg contacting bottom wall portion 56 of groove 52. At the same time, end wall area 36 of the inner leg 26 contacts forward side wall 54 of the groove, and tapered portion 40 contacts groove rear side wall 58. After the seal assembly C is snapped into place on the piston A, the piston may be inserted in the piston cylinder B.

Any further movement of the seal ring axially along the hub body portion 48 toward flange 50 is prevented by the engagement of end face 64 of anti-extrusion member 18 with flange end face 66. Once inner leg 26 is snapped into place in groove 52, any forces urging the seal ring 20 to detach from the piston hub are resisted by the above described interlocking relationship between the seal ring and the piston hub.

This interlocking construction also prevents the entry of mud or drilling fluid between the seal ring and the hub body portion so that expansion of the seal ring away from the body portion does not occur. Since the seal ring is closely received on body portion 48, all the air is squeezed out of the interface area therebetween. Elimination of the air is useful since trapped air could expand during the low pressure experienced in a suction stroke, and friction between seal ring 20 and cylinder B could then pull the seal ring away from the hub body portion.

Preferably, the outer or maximum diameter of outer leg outer side wall 28 is slightly larger than the inside diameter of a cylinder with which it is to be associated. Thus, outer leg 24 must flex inward when inserted into cylinder B. This is easy to accomplish because of the presence of seal ring aperture 46. Flexure of lip or outer leg 24 insures that a circumferential edge or corner 70 thereon is in intimate wiping contact with the inner wall of the cylinder.

With specific reference to FIG. 2, an O-ring type seal 72 is advantageously included in an aperture 74 on a rear side 76 of the piston hub flange 50. This O-ring sealingly engages piston rod 10 to prevent any drilling mud or other fluid which is being pumped from leaking past piston hub 16 through the slight clearance provided between axial passage 78 and the piston rod.

Referring to FIG. 3, lip edge 70 on outer leg 24 preferably has a radial lip taper or angle a of between 20°–30°. Such angle enables seal ring 20 to slide easily as the piston assembly is reciprocated in the cylinder while still providing excellent sealing characteristics.

It is also important that the width of annular aperture 46 between legs 24, 26 have at least some predetermined minimum width when the seal ring is in an operative condition with an associated cylinder. Prior art piston packings have included narrow apertures, and such constructions are disadvantageous since they form traps which become jammed with mud and other materials during the course of a slush pumping operation. In order to prevent such jamming, it is preferred that both outer leg inner side wall 32 and inner leg outer side wall 34 diverge outwardly by an angle b of approximately 15° relative to an imaginary cylinder which longitudinally bisects aperture 46, i.e., an included angle of approximately 30° between side walls 32, 34. It is evident that as pressurized fluid enters the aperture, inner leg 26 will be urged against hub body portion 48 and outer leg 24 will be urged against the inner wall of cylinder B. Thus, the provision of a relatively large aperture 46 enables legs 24, 26 to better perform their intended functions at high pressure.

Although the aperture 46 is relatively large, it is sized such that when seal member 20 is in position in cylinder B, it is compressed toward a narrower dimension when lip or outer leg 24 is moved to the installed condition as in the dotted line showing of FIG. 3. The amount of closure is such that the reduced width W of aperture 46 is less than the thickness W' of inner leg 26 at end wall area 36 thereof. This relationship, in combination with the limited compressibility of member 20, makes it substantially impossible for the member 20 to be removed, intentionally or inadvertently, when the assembly is in the cylinder. In other words, the space remaining between the outer leg 24 and the inner leg 26 is not large enough to allow the inner leg to become completely dislodged from the groove 52, even under the high friction conditions encountered by slush pumps.

Inner leg 26 is of a substantial enough size and is suitably configured so as to overcome the force of friction tending to pull seal 20 away from the hub body. Paramount among the configurational advantages of the present invention is inner leg end wall area 36 which abuts groove forward side wall 54. Since surfaces 36, 54 are disposed substantially perpendicular to the axis of motion of the piston, they better resist the large frictional forces encountered during the pumping of gritty fluids than do piston seal locking arrangements previously available.

Among the advantages of the present invention is the provision of a flexible outer leg 24 which enables the seal ring to conform more readily to the walls of a cylinder which may be of non-uniform diameter due to wear or other causes. Also, a construction according to the present invention works to eliminate any tendency of the piston to "shimmy" within the cylinder, or to score the cylinder walls. Moreover, the substantial size of the inner leg 26 in combination with the substantial annular groove 52 provided on hub body portion 48 provides for a large locking force to prevent detachment of the seal ring from the piston hub. Finally, the outer leg 24 is flexed inwardly by the assembly of the piston A into the piston cylinder B such that the inner leg 26 will contact the outer leg 24 before the inner leg can become dislodged from the groove 52. This insures that the seal assembly C remains positively locked on the piston hub 16 as long as the piston A is in the cylinder B.

In a test of pistons constructed according to the invention, a significant improvement in life span and structural reliability was found. Also, the reciprocating pump pistons of the present invention were found to be capable of ready assembly since the seal ring could be easily snapped into place in the piston hub groove.

Although the invention has been shown and described with reference to a preferred embodiment, modifications and alterations will occur to others upon a reading and understanding of this specification. It is intended to include all such modifications and alterations insofar as they come within the scope of the appended claims or the equivalents thereof.

Having thus described the invention, it is now claimed:

1. A pump piston construction comprising:
   a piston rod adapted to be disposed within a cylinder;
   a piston hub secured to said piston rod and adapted to be reciprocated thereby, said hub including a flange portion having a cylindrical outer periphery of a slightly smaller diameter than a cylinder with which it is adapted to be associated and a generally cylindrical body portion having a smaller diameter than said flange portion, said body portion terminating in a forward end spaced remote from said flange portion and including a circumferential groove having a forward side wall adjacent said forward end;
   an annular piston seal ring having a body member slideably received and closely disposed about said hub body portion, an axially extending inner leg having a radially inwardly extending end portion in mating relation with said body portion groove and an outer leg defining an annular sealing lip having a maximum outer diameter slightly greater than the inner diameter of a cylinder with which said piston is adapted to be associated; and,
   said inner and outer legs being laterally spaced apart from each other to facilitate radial outward flexure of said inwardly extending end portion of said inner leg during installation of said seal ring on said hub body portion with an inner leg end wall area closely bounded by said groove forward side wall, said outer leg adapted to yieldably flex radially inward in response to axial insertion thereof into an associated cylinder, said inward flexure being to a predetermined extent such that said inner leg will contact said outer leg before said inner leg end wall area can be moved to a fully unbounded relationship with said groove forward side wall to thereby prevent said seal ring from sliding off said hub body portion.

2. The piston of claim 1 wherein said circumferential groove further includes a bottom wall and a tapered rear side wall spaced toward said flange portion from said forward side wall, said seal ring inner leg further including an inner side wall portion and a tapered inner side wall portion received in said groove and closely bounded by said bottom wall and rear side wall, respectively.

3. The piston of claim 1 wherein the space between said inner and outer legs is defined by an aperture extending axially of said seal ring, side walls of said aperture tapering toward each other axially into said seal ring for preventing entrapment of solid particles therein.

4. The piston of claim 3 wherein the side walls of said aperture are disposed relative to each other at an included angle of approximately 30°.

5. The piston of claim 1 further including an anti-extrusion member received on said hub body portion intermediate said seal ring and said hub flange portion.

6. The piston of claim 5 wherein said anti-extrusion member and said seal ring are integral.

7. The piston of claim 1 further including seal means interposed between said piston hub and said piston rod.

8. A pump piston construction adapted for pumping drilling mud, said pump comprising:
a piston rod;
a piston hub secured to said piston rod and adapted to be reciprocated thereby, said hub including a flange portion having a cylindrical outer periphery of a slightly smaller diameter than an associated pump cylinder and a generally cylindrical body portion, said body portion having a smaller diameter than said flange portion terminating in a forward end spaced remote from said flange portion and including a circumferential groove adjacent said forward end; and,
an annular seal assembly closely positioned about said hub body portion, said seal assembly including:
a seal ring having a body which includes an axially extending annular inner leg and an axially extending annular outer leg, said legs being normally resiliently biased apart, said inner leg being disposed in mating relation with said hub body portion groove and said outer leg being adapted for receipt in sealing relation with the interior of an associated pump cylinder, said body having an axially extending annular aperture between said inner and outer legs for enhancing the resiliency of said legs and being defined between a pair of tapering walls; and
an annular anti-extrusion member intermediate said seal ring and hub flange;
said inner leg having an end wall area, an axial inner side wall portion, and a tapered inner side wall portion which fit into said hub body portion circumferential groove, said tapered inner side wall portion cooperating with said forward end during assembly of said seal ring on said hub to facilitate outward flexure of said inner leg around said hub, said seal ring inner leg end wall area and a forward end wall of said groove being generally perpendicular to a path of reciprocation of the pump and closely cooperating with said each other for inhibiting removal of said seal ring from said piston hub;
said outer leg when received in said cylinder being flexed inwardly such that the outer radial periphery of the inner leg engages the inner periphery of the outer leg before the inner leg end wall is free to move past the forward end wall of said groove, thus preventing removal of the seal ring from the piston hub.

9. The piston of claim 8 wherein the tapering walls defining said annular aperture are disposed at an included angle of approximately 30° relative to each other and converge axially into said seal ring.

10. The piston of claim 8 wherein said seal ring outer leg defines an annular sealing lip which is adapted to yield radially inward when said seal ring is inserted into an associated well casing.

11. The piston of claim 10 wherein the outer terminal of said outer leg is radially tapered axially outward of said seal ring, the radial taper angle of said sealing lip being between 20°–30°.

12. The piston of claim 8 wherein when said piston hub is inserted in a suitable associated piston cylinder said seal ring outer leg flexes inwardly and reduces the width dimension of said aperture to a predetermined extent such that said seal ring inner leg will contact said seal ring outer leg before said seal ring inner leg can become detached from said piston hub circumferential groove thereby positively preventing said seal ring from becoming dislodged from said piston hub.

* * * * *